Jan. 23, 1962 R. J. LA MANNA 3,018,047

BINARY INTEGER DIVIDER

Filed Feb. 11, 1957

INVENTOR.
RICHARD J. LA MANNA

BY Jerry Light

ATTORNEY

United States Patent Office 3,018,047

Patented Jan. 23, 1962

3,018,047

BINARY INTEGER DIVIDER

Richard J. La Manna, Whippany, N.J., assignor to Monroe Calculating Machine Company, Orange, N.J., a corporation of Delaware Filed Feb. 11, 1957, Ser. No. 639,469

10 Claims. (Cl. 235—165)

This invention relates to a circuit arrangement to divide and, more particularly, to obtain the integral portion of the number of times an integer value is contained in a quantity expressed in the binary notation.

In apparatus handling numbers expressed in the binary notation in serial form, division by powers of two is easily accomplished by shifting the pulse train representing a quantity in the direction of less significance. The result of such shifting is a pulse train representing a quantity which is equal to division by two to the power of the number of bit of pulse times shifted. However, division by powers of two by itself does not fit completely with calculations in the business field or elsewhere where division by integers other than powers of two are desired. In co-pending application Serial Number 632,737 there is shown apparatus for dividing by integers which are one more or less than a power of two. The instant invention provides apparatus for dividing by additional integers.

Accordingly, the object of the invention is to obtain the integral portion of the number of times an integer value is contained in a quantity expressed in the binary notation.

Figure 1:
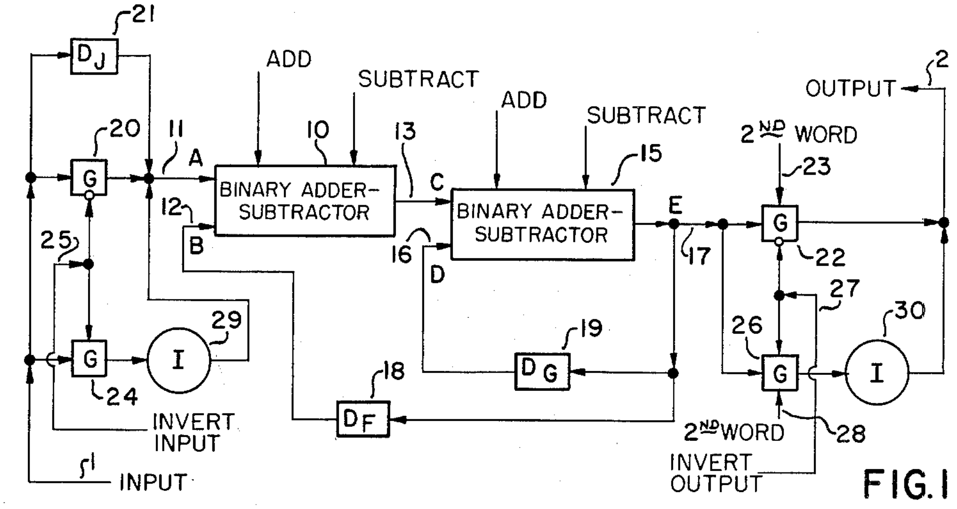
Figures 2A, 2B:
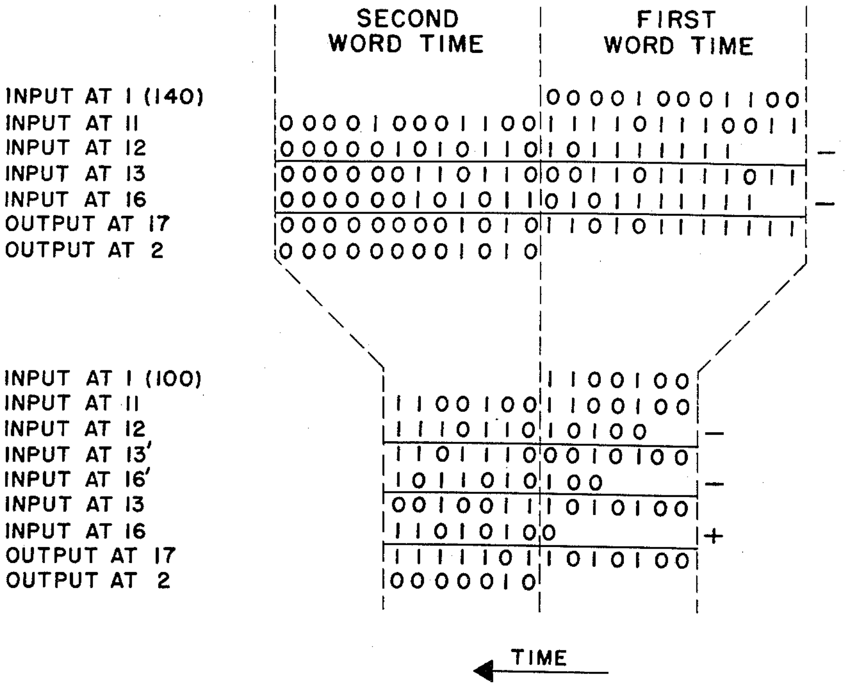

Other objects and a fuller understanding of the invention may be had by referring to the following description and claims, taken in conjunction with the accompanying drawings in which:

FIGURE 1 shows the general circuit of the invention;

FIGURE 2*a* shows diagrammatically an example of the operation of the circuit of FIGURE 1, and FIGURE 2*b* shows diagrammatically another example of the operation of the circuit of FIGURE 1.

Referring to the drawings there is shown in FIGURE 1 a serial binary adder-subtractor circuit 10 having augend-minuend input 11, addend-subtrahend input 12 and sum-difference output 13. A second serial binary adder-subtractor circuit 15 is present having an augend-minuend input connected to the sum-difference output 13 of adder-subtractor 10, addend-subtrahend input 16 and sum-difference output 17. Circuits 10 and 15 perform either addition or subtraction in accordance with control signals applied and may be of the type described on pages 283–285 of "High Speed Computing Devices" by the Staff of Engineering Research Associates, published by McGraw-Hill Book Company, 1950. Connected between sum-difference output 17 and addend-subtrahend input 12 is a delay device 18 for delaying transmission of pulses supplied to its input for an integer number of pulse times. Connected between sum-difference output 17 and addend-subtrahend input 16 is a delay device 19 for delaying transmission of pulses supplied to its input for an integer number of pulse times. Delay devices 18 and 19 may be of the well known lumped parameter artificial transmission line type, either as separate elements or as a single line whose delay is equal to the longest delay required tapped at intermediate points for lesser delay, shown as separate elements for convenience of disclosure.

Identifying the input at 11 as A, the input at 12 as B, the output-input at 13 as C, the input at 16 as D, the output at 17 as E, the number of pulse times for which delay device 18 delays transmission as F, and the number of pulse times for which delay device 19 delays transmission as G, where circuits 10 and 15 are operating for addition:

$$E=A+2^{F}E+2^{G}E$$
$$E-2^{F}E-2^{G}E=A$$
$$E(1-2^{F}-2^{G})=A \quad (1)$$
$$E=\frac{A}{1-2^{F}-2^{G}}$$

In the situation where circuits 10 and 15 are both operating for subtraction:

$$E=A-2^{F}E-2^{G}E$$
$$E+2^{F}E+2^{G}E=A$$
$$E(1+2^{F}+2^{G})=A \quad (2)$$
$$E=\frac{A}{1+2^{F}+2^{G}}$$

And in the situation where circuit 10 is operating for addition and circuit 15 is operating for subtraction:

$$E=A+2^{F}E-2^{G}E$$
$$E-2^{F}E+2^{G}E=A$$
$$E(1-2^{F}+2^{G})=A \quad (3)$$
$$E=\frac{A}{1-2^{F}+2^{G}}$$

It is seen from Equations 1, 2 and 3 that the delay times of delay devices 18 and 19 can be selected to provide a large number of integer divisors of the input A. It should be noted in connection with Equation 3 that it matters not whether the adder is first in the series or second just so long as the delay encountered in the delay device associated with the respective circuits 10 and 15 is maintained.

If it is desired to obtain the integral number of times that a quantity contains the value 13, then using Equation 2 with $F=3$ and $G=2$ this operation can be performed. The same operation could be performed utilizing Equation 3 with $F=2$ and $G=4$. Divisors may be negative giving a negative result according to either Equations 1 or 3 and in such a situation the desired result would be obtained by complementing the resultant pulse train.

The above discussion is applicable for binary quantities equal in value to an integral multiple of the divisors. However, if the value of the binary quantity is not an integral multiple of the divisor, the integral number of times the divisor is present in the quantity is not obtained. It is seen that, if the quantity to be divided, having a value K represented in a word time or J pulse times, is applied to the input 11 for two successive word times, there is applied to the input 11 a quantity whose value N is:

$$N=K+2^{J}K \text{ or}$$
$$N=(1+2^{J})K \quad (4)$$

However, if the quantity K is applied in its complement form during the first word time, the value N applied to input 11 is:

$$N=-K+2^{J}K \text{ or}$$
$$N=(2^{J}-1)K \quad (5)$$

By applying the pulse train representing the quantity to be divided for two successive word times or by applying the complement of the pulse train representing the quantity to be divided followed by the pulse train of the quantity itself, we obtain a variable $(2^{J}\pm1)$ which can be made an integral multiple of the divisor by the proper choice of J, the number of bit times allotted for the dividend pulse train or word. The value of J is, accordingly, determined by satisfying the equation:

$$2^{J}\pm1=\text{an integral multiple of the divisor} \quad (6)$$

Substituting in (6) from Equation 1:

$$2^J \pm 1 = m(1-2^F-2^G) \quad (7)$$

Substituting in (6) from Equation 2:

$$2^J \pm 1 = m(1+2^F+2^G) \quad (8)$$

Substituting in (6) from Equation 3:

$$2^J \pm 1 = m(1-2^F+2^G) \quad (9)$$

M is any integer. In general, it is necessary to solve Equations 7, 8 and 9 to determine the exact value of J and the polarity of the sign.

It has been found that when an input is applied to the circuit of this invention for two word times in accordance with either Equation 4 or 5 that the pulse train appearing at the output of the last adder-subtractor in the chain, circuit 15 of FIG. 1, during the second word time is related to the integral portion of the number of times the integer divisor is contained in the input quantity. The relation that this obtained pulse train bears to the desired result is either direct (the result) or inverse (the complement of the result). The sign of the right hand portion of Equation 1 or 3 when the values for F and G being used are substituted therein determines whether the relationship is direct or inverse: a plus sign means direct and a minus sign means inverse.

Referring again to FIGURE 1, there is provided between the input 1 to the invention and the input 11 of adder-subtractor 10 a delay device 21 for delaying transmission for the number of pulse times or bits making up a complete word, J. In parallel with delay device 21 is an inhibitory gate 20 as well as a series connected permissive gate 24 and inverter 29. Control signal 25 is selectively applied to both gates 20 and 24 during the first word time of operation of the apparatus. Signal 25 will inhibit gate 20 and permit operation of gate 24 when applied; when not applied, gate 20 will be operative and gate 24 will be inoperative.

Delay device 21 may be of the artificial transmission line type or more conveniently may be a shifting register as disclosed in Patent Number 2,638,542 to Fleming, Jr., or may be a mercury delay line as described on pages 341–348 of the book "High Speed Computing Devices," supra. Gates 20 and 24, as well as gates to be mentioned hereinafter, may be any one of the known gate circuits such as a multi-grid vacuum tube or diode circuit. Inverter 29 may be a triode amplifier the anode of which represents the complement or inverse of signals applied to its grid.

In the absence of control signal 25, the pulse train applied at input 1 will pass through gate 20 and be applied directly to the augend-minuend input 11 of adder-subtractor 10. The input pulse train is applied to the input of delay device 21. At the end of the time for transmission of the entire input word, delay device 21 will begin feeding its output to the input 11 of adder-subtractor 10. In this way, the input pulse train will be applied to the augend-minuend input of adder-subtractor 10 for two successive word times. In the presence of control signal 25, identified as Invert Input, the pulse train applied at input 1 will pass through gate 24, be inverted in inverter 29 and the complement of the input pulse train so resulting will be applied to input 11 of adder-subtractor 10 while at the same time the input pulse train is applied to the input of delay device 21 as before.

It is to be understood that if the input pulse train is available from the input source for two successive word times then delay device 21 is not necessary, and the input pulse train is reapplied from the input source during the second word time. As before, gates 20 and 24 will be controlled by means of control signal 25 to effect complementing or not of the input pulse train during the first word time. During the second word time of operation, control signal 25 will always be absent and the input pulse train will be applied via gate 20 in its absolute form.

Connected between the output 17 of adder-subtractor 15 and the output line 2 for the invention is a gate 22 paralleled by gate 26 and inverter 30 connected in series. Both the gates 22 and 26 are controlled via lines 23 and 28, respectively, to be operative only during the second word time with regard to the input at 11 of adder-subtractor 10. Further, a control signal identified as invert output is applied via line 27 to inhibit gate 22 and permit or render operative gate 26. Accordingly, in the absence of control signal 27 the pulse train appearing at line 17 during the second word time of operation of the invention is passed directly to output line 2 via gate 22 and in the presence of control signal 27 is complemented via gate 26 and inverter 30 before being applied to the output line 2.

FIGURE 2*a* illustrates the operation of the invention to obtain the integral portion of the number of times the value 13 is contained in a quantity expressed in serial binary notation. For this example, the input quantity has been taken as 140. Referring to Equation 2 the divisor of 13 is obtained by having $F=3$ and $G=2$ while both circuits 10 and 15 are controlled to operate for subtraction. Reference to Equations 4 and 5 indicates that if the input pulse train is applied in accordance with Equation 4 the pulse train must contain an odd multiple of 6 number of bits, whereas if the input pulse train is applied in accordance with Equation 5 an even multiple of 6 number of bits must comprise the input pulse train.

In particular, the dividend 140 has been chosen as an input by way of example. The divisor for the example given is 13. As described above, the number of pulse times or the word length for the pulse train carrying the dividend significance, 140, is represented by J. Considering only Equation 4, in order for the co-efficient $(2^J+1)$ to be an integral multiple of the divider 13, it is found that J must equal 6, 18, 30, etc., i.e. 1×6, 3×6, 5×6, etc. or odd multiples of 6. Considering now Equation 5, in order that the co-efficient $(2^J-1)$ be an integral multiple of 13, it is found that J must equal 12, 24, 36, etc., i.e., 2×6, 4×6, 6×6, etc. or even multiples of 6.

It should, however, be noted that the binary pulse train to represent 140 requires at least 8 pulse positions. Therefore, the minimum word length for the input pulse train is 12 pulse positions, i.e. 2×6, and that such a word must be used in accordance with Equation 5. This is chosen for an example since it is the smallest word length which can satisfy all the criteria. A word length of 18 pulse positions applied in accordance with Equation 4 is just as applicable.

The illustration of FIGURE 2*a* utilizes the application of a pulse train comprising 12 bits and so requires complementing of the input pulse train during the first word time per Equation 5. For this purpose, control signal 25 will be present. The output pulse train during the second word time is in absolute form and is caused to pass directly to the output line 2 by the absence of control signal 27. The result 10 in binary form, 1010, is obtained.

More specifically, it should be noted that the bits occur least significant first in time where time is measured from right to left in FIGURES 2*a* and 2*b*. During the first word time the bits of the dividend 140 serially pass via input 1, gate 24, and inverter 29 to augend-subtrahend input 11, and also directly from input 1 to delay device 21. During the first three bit times no subtractions are performed by adder-subtractor 10 since the input 12 does not start receiving bits for three pulse times after the entry of a bit into adder-subtractor 10. The remainder resulting from the subtractions performed by adder-subtractor 10 is shown as the input at 13. This remainder is subtracted by the bits received via delay device 19. It should be noted that the first bit received by addend-subtrahend input 16 is two bit times after the entry of the least significant bit of the dividend into the binary adder-subtractor 10. The remainder from these subtractions is shown as the output at 17. At the start of the second word time, the gate 22 is alerted and the result shown as the output at 2 is obtained in serial binary form least significant digit first in time.

The invention is not limited to the use of two adder-subtractors connected in chain fashion, but may include any plurality of such circuits connected in a serial chain, as illustrated in FIGURE 1, wherein the sum-difference output of each adder-subtractor is connected to the augend-minuend input of the adder-subtractor next in line and a delay is connected between the sum-difference output of the adder-subtractor last in the series and the addend-subtrahend input of each of the adder-subtractors. The addition of each adder-subtractor circuit results in an additional 2 to a power term in the denominator of any of Equations 1, 2, or 3. The additional 2 to a power term will have a minus sign if the additional circuit is operated for addition, and will have a plus sign if the additional circuit is operated for subtraction.

In order to obtain division by the value 43, it can be shown that three adder-subtractor circuits connected in chain fashion are required. FIGURE 2*b* illustrates the operation of such a circuit wherein there will be connected in series or in chain fashion two circuits operating for subtraction and one circuit operating for addition. The delay times for the respective delay devices or portions of single tapped delay device connected between the output from the adder-subtractor last in the series to the addend-subtrahend input of each of the adder-subtractors will be two pulse times for one of the subtractors, four pulse times for the other subtractor and six pulse times for the adder. FIGURE 2*b* illustrates the pulse trains present at various points of the circuit referring to FIGURE 1 for reference numerals. A third adder-subtractor circuit is to be understood as being connected between circuits 10 and 15 with its augend-minuend input as 13', its addend-subtrahend input as 16', and its output as 13. With this arrangement the illustrated operation of FIGURE 2*b* shows the pulse trains present if circuit 10 is operated for subtraction with the delay encountered in delay device 18 as 2 pulse times, the additional adder-subtractor circuit 32 next in the chain operated for subtraction with the delay of its associated delay device (not shown) as 4 pulse times, and circuit 15 operated for addition with the delay encountered in delay device 19 as 6 pulse times. The input pulse train containing seven bits is applied in the absence of control signal 25 to the augend-minuend input 11 of the first adder-subtractor 10 in accordance with Equation 4. The pulse train appearing at the sum-difference output 17 during the second word time will be in complement form and control signal 27 will be applied to cause this pulse train to pass through inverter 30 before being applied to the output line 2. The quantity represented by the input pulse train is taken here as 100 and the result pulse train representing 2 is obtained.

Although the invention has been described with a certain degree of particularity, it is understood that the present disclosure has been made only by way of example and that numerous changes in the details of construction and the combination and arrangements of parts may be resorted to without departing from the spirit and scope of the invention as hereinafter claimed.

What is claimed is:

1. A circuit arrangement for obtaining the integral portion of the number of times an integer value is contained in a quantity to be divided represented by a serial train of pulses in the binary notation, comprising a plurality of serial binary adder-subtractor circuits each having an augend-minuend input, an addend-subtrahend input and a sum-difference output connected in chain fashion such that the sum-difference output of each of said adder-subtractors is connected to the augend-minuend input of the adder-subtractor next in line, delay means having a plurality of outputs equal in number to said plurality of adder-subtractor circuits for delaying transmission to each of said outputs of a pulse train applied at its input for an integral number of pulse times related to said integer value, the sum-difference output of said adder-subtractor last in said series being connected to the input of said delay means, each of the outputs of said delay means being connected to the addend-subtrahend input of one of said adder-subtractors, respectively, and means for separately controlling said adder-subtractor circuits to add or to subtract, a pulse train related to said quantity to be divided being presented to the augend-minuend input of the adder-subtractor first in said series and a pulse train related to the number of times said integer value is contained in said quantity appearing at the sum-difference output of said adder-subtractor last in said series.

2. A circuit arrangement for obtaining the integral portion of the number of times an integer value is contained in a quantity represented by a serial train of pulses in the binary notation, comprising a plurality of serial binary adder-subtractor circuits each having an augend-minuend input, an addend-subtrahend input and a sum-difference output connected in chain fashion such that the sum-difference output of each of said adder-subtractors is connected to the augend-minuend input of the adder-subtractor next in line, said sum-difference outputs transmitting result pulse trains in response to pulse trains received by said addend-subtrahend inputs and said augend-minuend inputs, delay means having a plurality of outputs equal in number to said plurality of adder-subtractor circuits for delaying transmission to each of said outputs of a pulse train applied at its input for an integral number of pulse times, the sum-difference output of said adder-subtractor last in said series being connected to the input of said delay means, each of the outputs of said delay means being connected to the addend-subtrahend input of one of said adder-subtractors, respectively, means for separately controlling said adder-subtractor circuits to add or to subtract, means for applying the pulse train representing the quantity to be divided first and second times in succession to the augend-minuend input of said adder-subtractor first in said series and means for obtaining a pulse train related to the result pulse train from the sum-difference output of said adder-subtractor last in said series during the second time said pulse train representing the quantity to be divided is applied.

3. A circuit arrangement for obtaining the integral portion of the number of times an integer value is contained in a quantity represented by a serial train of pulses in the binary notation, comprising a plurality of serial binary adder-subtractor circuits each having an augend-minuend input, an addend-subtrahend input and a sum-difference output connected in chain fashion such that the sum-difference output of each of said adder-subtractors is connected to the augend-minuend input of the adder-subtractor next in line, said sum-difference outputs transmitting result pulse trains in response to pulse trains received by said addend-subtrahend inputs and said augend-minuend inputs, delay means having a plurality of outputs equal in number to said plurality of adder-subtractor circuits for delaying transmission to each of said outputs of a pulse train applied at its input for an integral number of pulse times, said integral number of pulse times being related to said integer value, the sum-difference output of said adder-subtractor last in said series being connected to the input of said delay means, each of the outputs of said delay means being connected to the addend-subtrahend input of one of said adder-subtractors, respectively, means for separately controlling said adder-subtractor circuits to add or to subtract, means for applying in succession first the complement of the pulse train representing the quantity to be divided to the augend-minuend input of said adder-subtractor first in said series and, second, the pulse train representing the quantity to be divided to the augend-minuend input of said adder-subtractor first in said series and means for obtaining a pulse train related to the result pulse train from the sum-difference output of said adder-subtractor last in said series during the application of the pulse train representing the quantity to be divided to the augend-minuend input of said adder-subtractor first in said series.

4. A circuit arrangement for obtaining the integral portion of the number of times an integer value is contained in a quantity represented by a serial train of pulses in the binary notation, comprising a plurality of serial binary adder-subtractor circuits each having an augend-minuend input, an addend-subtrahend input and a sum-difference output connected in chain fashion such that the sum-difference output of each of said adder-subtractors is connected to the augend-minuend input of the adder-subtractor next in line, said sum-difference outputs transmitting result pulse trains in response to pulse trains received by said augend-minuend inputs and said addend-subtrahend inputs, delay means having a plurality of outputs equal in number to said plurality of adder-subtractor circuits for delaying transmission to each of said outputs of a pulse train applied at its input for an integral number of pulse times, said integral number of pulse times being related to said integer value, the sum-difference output of said adder-subtractor last in said series being connected to the input of said delay means, each of the outputs of said delay means being connected to the addend-subtrahend input of one of said adder-subtractors, respectively, means for separately controlling said adder-subtractor circuits to add or to subtract, means for applying in succession, first, the complement of the pulse train representing the quantity to be divided to the augend-minuend input of said adder-subtractor first in said series and, second, the pulse train representing the quantity to be divided to the augend-minuend input of said adder-subtractor first in said series during a second pulse train time, means for obtaining a result pulse train from the sum-difference output of said adder-subtractor last in said series during the application of the pulse train representing the quantity to be divided to the augend-minuend input of said adder-subtractor first in said series, and means in parallel with said delay means for complementing said obtained pulse train.

5. In combination a serial binary adder-subtractor circuit having an augend-minuend input, an addend-subtrahend input and a sum-difference output, a second serial binary adder-subtractor circuit having an augend-minuend input connected to the sum-difference output of said first adder-subtractor, an addend-subtrahend input and a sum-difference output, delay means for delaying transmission for an integral number of pulse times having an input connected to the output of said second adder-subtractor, an output connected to the addend-subtrahend input of said first adder-subtractor and a second output connected to the addend-subtrahend input of said second adder-subtractor, and means for separately controlling said adder-subtractor circuits to add or to subtract.

6. In combination a serial binary adder circuit having an augend input, an addend input and a sum output, a second serial binary adder circuit having an augend input connected to the sum output of said first adder, an addend input and a sum output, delay means for delaying transmission for an integral number of pulse times having an input connected to the output of said second adder, an output connected to the addend input of said first adder and a second output connected to the addend input of said second adder.

7. In combination a serial binary subtractor circuit having a minuend input, a subtrahend input and a difference output, a second serial binary subtractor circuit having a minuend input connected to the difference output of said first subtractor, a subtrahend input and a difference output, delay means for delaying transmission for an integral number of pulse times having an input connected to the output of said second subtractor, an output connected to the subtrahend input of said first subtractor and a second output connected to the subtrahend input of said second subtractor.

8. In combination a serial binary adder circuit having an augend input, an addend input and a sum output, a serial binary subtractor circuit having a minuend input connected to the sum output of said adder, a subtrahend input and a difference output, delay means for delaying transmission for an integral number of pulse times having an input connected to the output of said subtractor, an output connected to the addend input of said adder and a second output connected to the subtrahend input of said subtractor.

9. In combination a serial binary subtractor circuit having a minuend input, a subtrahend input and a difference output, a serial binary adder circuit having an augend input connected to the difference output of said subtractor, an addend input and a sum output, delay means for delaying transmission for an integral number of pulse times having an input connected to the output of said adder, an output connected to the subtrahend input of said subtractor and a second output connected to the addend input of said adder.

10. A circuit arrangement for obtaining the integral portion of the number of times an integer value is contained in a quantity represented by a serial train of pulses in the binary notation, comprising a plurality of serial binary adder-subtractor circuits, each having an augend-minuend input, an addend-subtrahend input and a sum-difference output connected in chain fashion such that the sum-difference output of each of said adder-subtractors is connected to the augend-minuend input of the adder-subtractor next in line, delay means having a plurality of outputs equal in number to said plurality of adder-subtractor circuits for delaying transmission to each of said outputs of a pulse train applied to its input for an integral number of pulse times, the sum-difference output of said adder-subtractor last in said series being connected to the input of said delay means, each of the outputs of said delay means being connected to the addend-subtrahend input of one of said adder-subtractors, respectively, means for separately controlling said adder-subtractor circuits to add or to subtract, means for applying the pulse train representing the quantity to be divided to the augend-minuend input of said adder-subtractor first in said series for two successive pulse train times, means for obtaining a pulse train from the sum-difference output of said adder-subtractor last in said series during said second pulse train time and means for complementing said obtained pulse train.

References Cited in the file of this patent

UNITED STATES PATENTS

| | | |
|---|---|---|
| 2,701,095 | Stibitz | Feb. 1, 1955 |
| 2,758,787 | Felker | Aug. 14, 1956 |
| 2,802,202 | Lanning | Aug. 6, 1957 |

FOREIGN PATENTS

| | | |
|---|---|---|
| 678,427 | Great Britain | Sept. 3, 1952 |